(12) United States Patent
Battat et al.

(10) Patent No.: US 10,637,264 B2
(45) Date of Patent: Apr. 28, 2020

(54) PORTABLE SWITCHING POWER SUPPLY WITH ATTACHABLE BATTERY PACK AND ENCLOSURE

(71) Applicant: POWERTEC SOLUTIONS INTERNATIONAL LLC, Hollywood, FL (US)

(72) Inventors: Stanley Battat, Hollywood, FL (US); Drew M. Hardin, Nashville, TN (US)

(73) Assignee: PowerTec Solutions International LLC, Hollywood, FL (US)

( * ) Notice: Subject to any disclaimer, the term of this patent is extended or adjusted under 35 U.S.C. 154(b) by 0 days.

(21) Appl. No.: 14/864,149

(22) Filed: Sep. 24, 2015

(65) Prior Publication Data

US 2016/0172902 A1 Jun. 16, 2016

Related U.S. Application Data

(60) Provisional application No. 62/054,495, filed on Sep. 24, 2014.

(51) Int. Cl.
*H02J 7/00* (2006.01)

(52) U.S. Cl.
CPC .......... *H02J 7/0044* (2013.01); *H02J 7/0024* (2013.01); *H02J 7/0068* (2013.01)

(58) Field of Classification Search
CPC .... H02J 9/061; H02J 9/062; H02J 1/10; H02J 7/0044

USPC ...................................................... 307/64–66
See application file for complete search history.

(56) References Cited

U.S. PATENT DOCUMENTS

| | | | | |
|---|---|---|---|---|
| 5,369,565 A | * | 11/1994 | Chen | H02J 7/0042 224/902 |
| 5,563,493 A | * | 10/1996 | Matsuda | G06F 1/263 320/124 |
| 5,616,968 A | * | 4/1997 | Fujii | H02J 3/38 307/150 |
| 2006/0056142 A1 | * | 3/2006 | Takahashi | G06F 1/30 361/679.33 |
| 2012/0028105 A1 | * | 2/2012 | Kumar | H01M 4/131 429/149 |
| 2013/0326237 A1 | * | 12/2013 | Holdengreber | G06F 1/26 713/300 |

* cited by examiner

*Primary Examiner* — Alfonso Perez Borroto
(74) *Attorney, Agent, or Firm* — Robert M. Schwartz; Kerry P. Sisselman

(57) ABSTRACT

A switchable direct current voltage power supply for powering a device having an uninterruptible power supply with additional standby power capacity where the switching power supply has a power input and a power output for powering a device with a first battery pack attachable to the switching power supply for providing power to the device when the power input fails and a second battery pack attachable to the first power supply providing additional standby power capacity and where the attachable battery pack utilizes lithium chemistry.

7 Claims, 8 Drawing Sheets

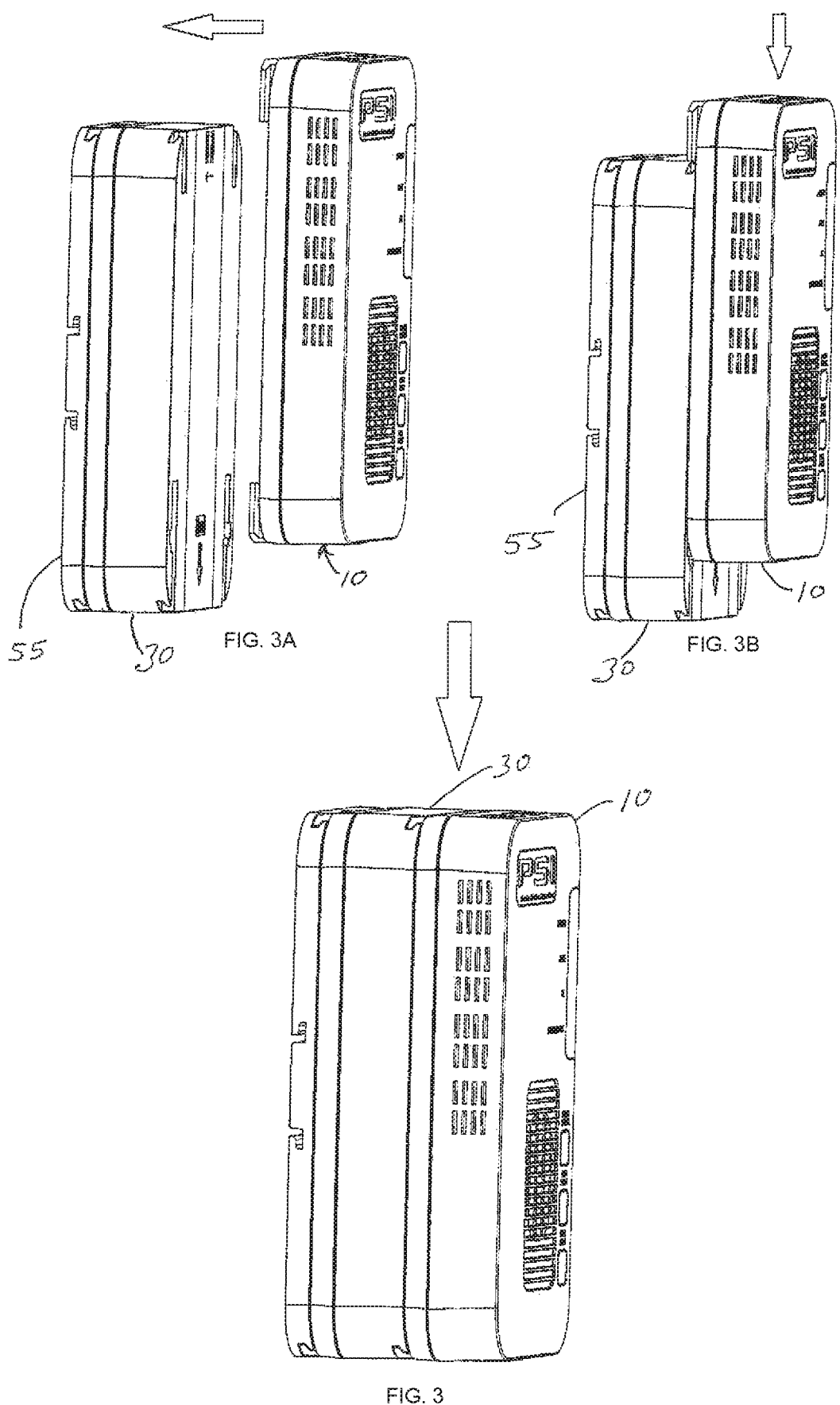

PORTABLE SWITCHING POWER SUPPLY WITH ATTACHABLE BATTERY PACK AND ENCLOSURE

CROSS-REFERENCE TO RELATED APPLICATIONS

This application claims the benefit of U.S. Provisional Application Ser. No. 62/054,495, filed on Sep. 24, 2014, entitled Universal Enclosure for Optical Network and Circuit, the prior application is herewith incorporated by reference in its entirety.

BACKGROUND OF THE INVENTION

The present invention is a portable switching direct current voltage power supply used at least in the telecommunications industry where low-voltage direct current devices require a switching power supply to step down the voltage from a standard one hundred ten (110) volt alternating current, or other voltage source, to 12 volt direct-current, or other desired step down voltage. Additionally these devices use uninterruptible power backup systems so that in the event of a power failure they continue to operate in order to provide continued telecommunication services or other services from the respective devices to the public.

FIELD OF THE INVENTION

The present invention is directed to offer new efficiencies in the field of telecommunications for size, scalabilty and functionality, by allowing an end user the capability to install anywhere within the premises, as a wall mount, desktop mount or floor mount, as well as allow for a stand-alone power supply or scalable uninterruptable power supply with optional stackable Li Ion (lithium ion) battery packs for customized battery backup availability.

The provided solution is the first to integrate a network solution to both provide a universal housing for a telecommunication's Customer Premises Equipment (CPE) device and also incorporate a switching Vdc (direct current voltage) power supply with optional battery packs utilizing lithium chemistry.

The provided solution offers alarm communication to the accepting CPE device and intelligent push button Vdc disconnection to the CPE in order to reset Vdc power to the CPE device rather than disconnecting cables or removing the battery pack to reset Vdc (output) power.

The switching Vdc power supply allows for attachment of one or multiple exterior attachable, removable and replaceable Li Ion battery pack(s) (also referred to herein as stackable) protecting the end user from traditional short circuit connections or crossing terminal wires during installation.

The switching Vdc power supply offers the only portable solution utilizing an attachable/removable battery pack comprised of a lithium chemistry power supply.

The universal enclosure is the only CPE device all-in-one enclosure to offer movable components that allow multiple manufactured CPE devices the ability to fit into the CPE device cavity of the enclosure and fit securely as well as house the custom switching Vdc power supply with optional attached Li Ion battery pack and ability to store and protect multiple input and output premises cables. The universal enclosure is also the only CPE device enclosure to offer a cavity designed specifically for a switching Vdc power supply and optional attached Li Ion battery pack, whereas all past solutions must use a detached switching Vdc power supply and installed sealed lead acid (SLA) battery, mounted separately from the CPE device and/or enclosure. Altogether, the universal enclosure is the first to offer installation of various manufactured CPE devices, fiber and cable management, and switching Vdc power supply and optional attached Li Ion battery pack all in one enclosure with no exposed wiring tying the switching Vdc power supply and optional attached Li Ion battery pack to the CPE device, when the protective cover is installed.

The switching Vdc power supply is also unique by offering push button reset Vdc power and alarm communications to the CPE device. The universal enclosure provides a convenient access door to initiate reset and alarm silence functions on the switching Vdc power supply.

DESCRIPTION OF THE RELATED ART

Traditional products include installation of CPE device with or without the device housing and offers no universal movement unspecific to the individually manufactured CPE device.

SUMMARY OF THE INVENTION

A portable switching Vdc power supply is provided with attachable Li Ion battery pack(s) designed for powering and providing "scalable" levels of standby battery backup to Customer Premises Equipment (CPE) devices. The switching Vdc power supply can operate as a stand-alone power supply to any accepting 12Vdc Customer Premises Equipment device and also operate as a "Uninterruptable Power Supply" (UPS) when partnering Li Ion battery pack(s) are connected and operational. The switching Vdc power supply with attachable Li Ion battery pack(s) is designed to offer the world's smallest portable telecommunications Uninterruptable Power Supply and the world's only solution to allow the customer the ability to add additional, "stackable" Li Ion battery packs for additional standby power capacity as required per installation. Together with one or multiple Li Ion battery packs, the switching Vdc power supply offers the only solution to utilize stackable battery packs utilizing Lithium Chemistry. The switching Vdc power supply with attachable Li Ion battery pack can be installed with accompanying universal enclosure to house switching Vdc power supply with attached Li Ion battery pack, CPE device and all input and output cable management.

BRIEF DESCRIPTION OF THE DRAWINGS

FIG. 3 is a side perspective of the switching Vdc power supply with attached, single Li Ion battery pack, working together as an uninterruptable power supply.

FIG. 3A is step 1 of an illustration for connecting a second switching Vdc power supply to single Li Ion battery pack.

FIG. 3B is step 2 of an illustration for connecting a second switching Vdc power supply to single Li Ion battery pack.

DESCRIPTION OF THE PREFERRED EMBODIMENTS

In reference to the drawings and, in particular, FIGS. 1, 1A-1D, the switching Vdc power supply 10 allows for optional attachable Li Ion battery pack(s) 30, also known as power pack(s).

In reference to the drawings and, in particular, FIGS. 1, 1A-1D, the switching Vdc power supply allows for the following Control Function Buttons 11:

Cold Start button 12—Ability to boot the switching Vdc power supply off an attached Li Ion battery pack when no Vac power is present, nor previously existing standby battery power.

Alarm Silence button 13—Ability to silence audible battery alarming initiated from "low battery, no battery or on battery."

N.I.R. Reset switch 14—"Network Interface Reset", allows for Vdc output "push button" disconnect. This function resets Vdc power the CPE device by holding "red" N.I.R. Button down for 3 seconds and releasing. The cold start switch 51 allows the power supply to cold start power off battery pack when alternating current line power is not present and new or replacement pack is connected. Alarm silence switch 13, 52 disables audible alarm function. Pressing and releasing the switch 13, 52 disables the audible alarm for 24 hours. Pressing and holding again for 15 seconds disables the audible alarm indefinitely. Pressing and holding the switch for another 15 seconds re-enables the audible alarm function.

Figure 1:
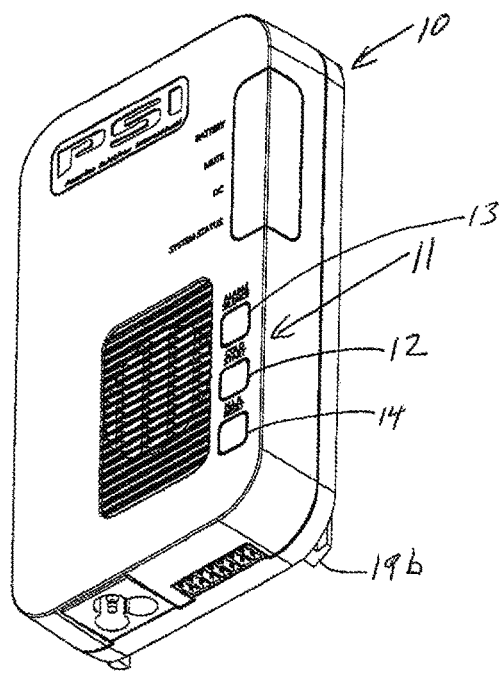
FIG. 1 is a perspective view of the switching Vdc power supply showing alarming/status LEDs and control push buttons namely, CPE reset button, alarm silence, and cold start buttons.
Figure 1D:
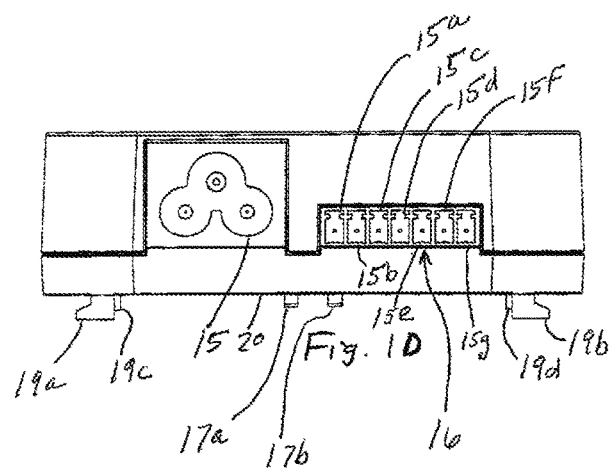
FIG. 1D is a bottom view of the switching Vdc power supply showing Vac input connection and Vdc output connection.
Figure 1A:
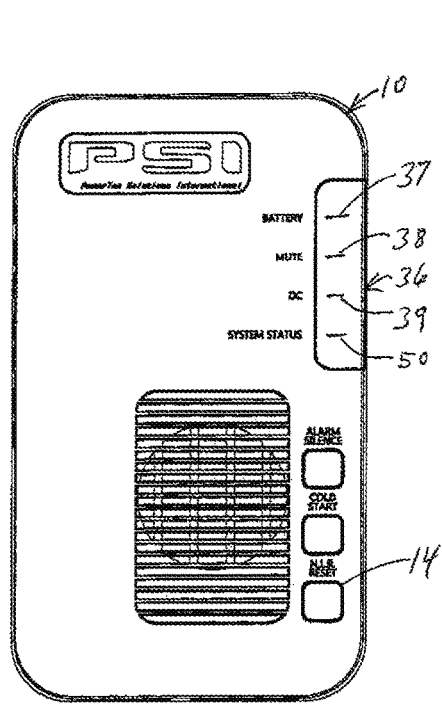
FIG. 1A is a front view of the switching Vdc power supply.
Figure 1B:
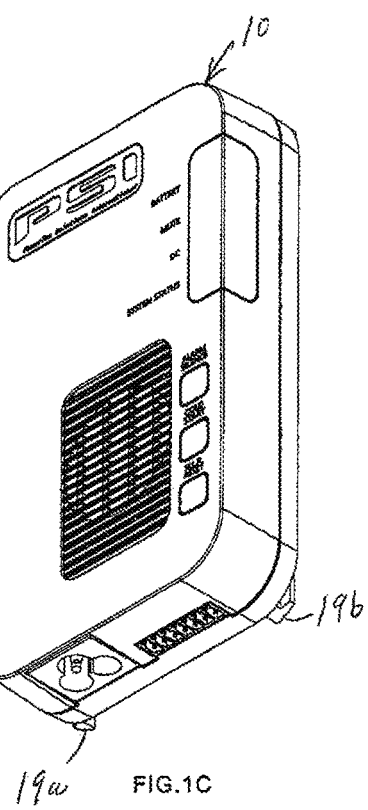
FIG. 1B is a side view of the switching Vdc power supply.
Figure 1C:
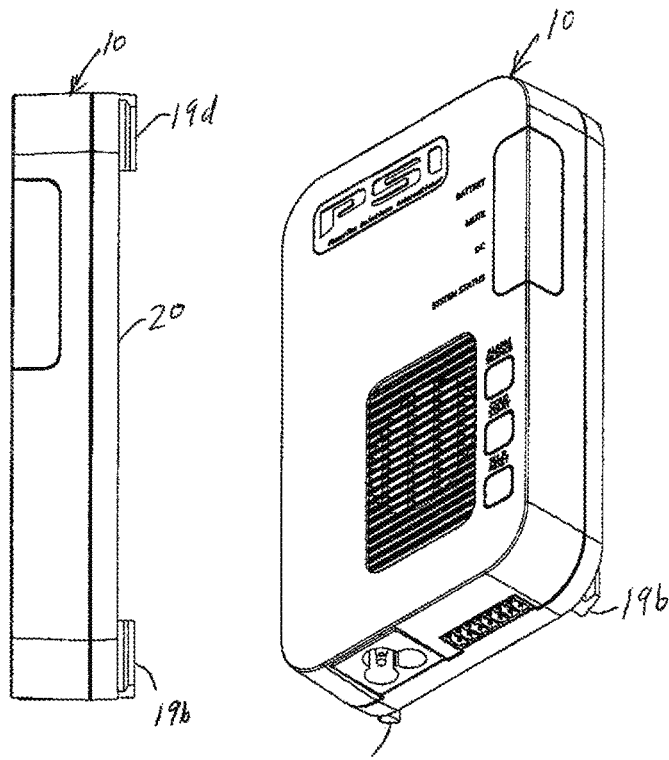
FIG. 1C is a bottom perspective view of the switching Vdc power supply.
Figure 2:
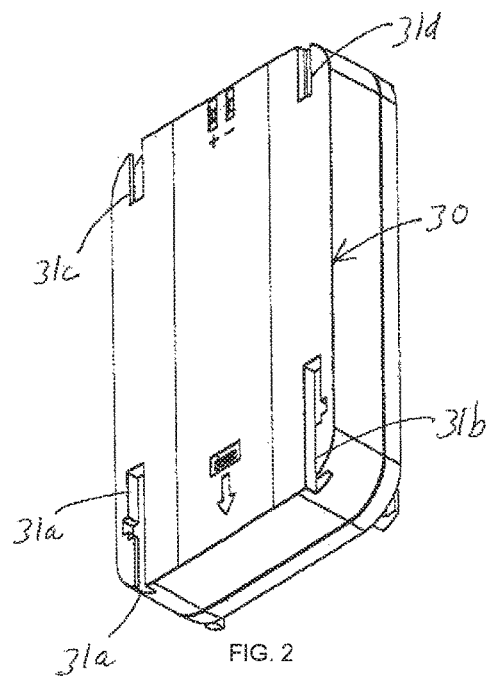
FIG. 2 is a rear perspective view of the Li Ion battery pack.
Figure 2D:
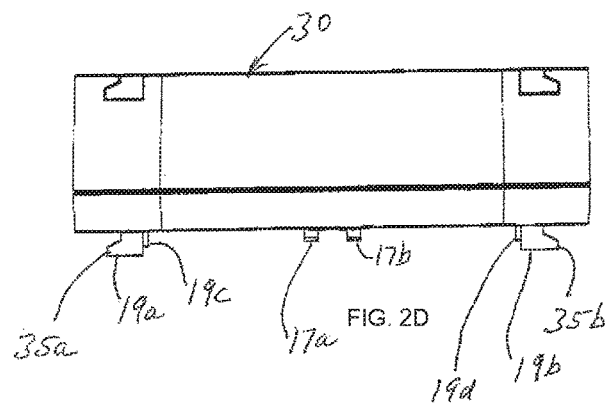
FIG. 2D is a bottom view of the Li Ion battery pack.
Figure 2A:
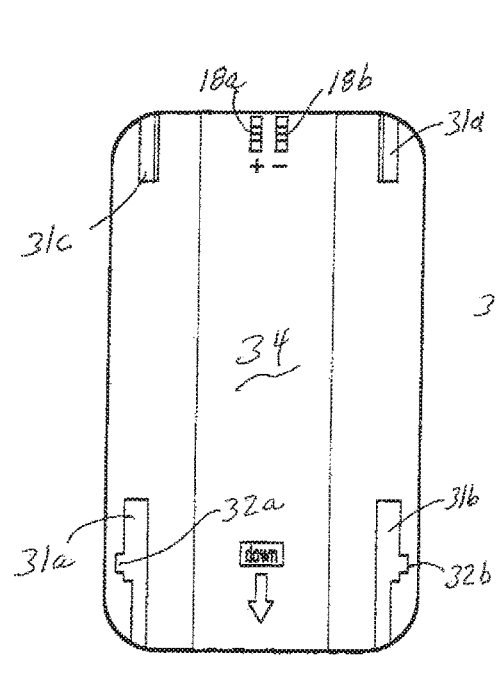
FIG. 2A is a rear view of the Li Ion battery pack design.
Figure 2B:
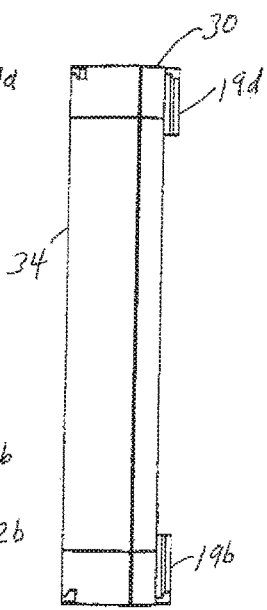
FIG. 2B is a side view of the Li Ion battery pack.
Figure 2C:
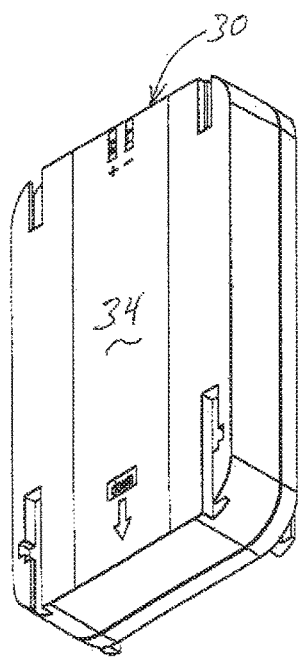
FIG. 2C is a perspective view of the Li Ion battery pack design.
Figure 9:
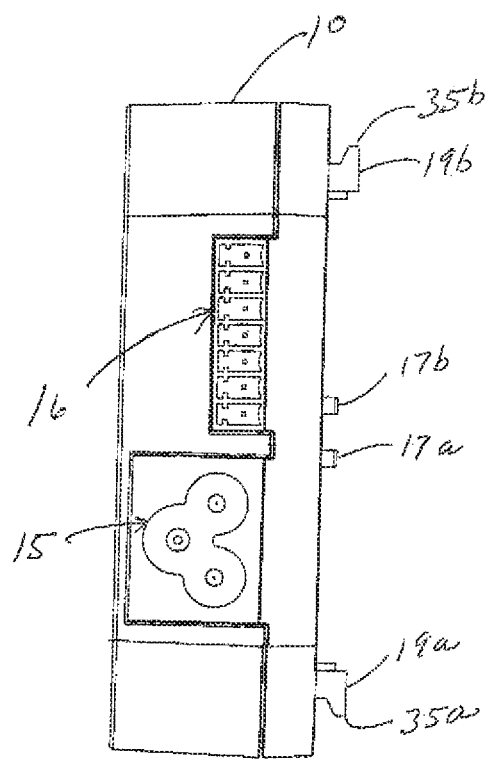
FIG. 9 is a bottom view of the switching Vdc power supply similar to FIG. 1C.

As seen in FIG. 1D and FIG. 9, the bottom of the power supply 10 includes an AC input power cord connector 15 for delivering the AC power to the power supply. Additionally the DC output and elementary connector 16 includes seven terminal connector pins. Pins 15a and 15b provide the output power to the CPE device. Pins 15c, 15d, 15e, 15f and 15g are used for communications between the power supply 10 and the CPE device (not shown).

Battery pack protruding spring loaded terminals 17a and 17b which provide connections for electrical communication between battery packs 30, as well as communication between the battery packs 30 and the power supply 10.

In reference to the drawings and, in particular, FIGS. 2, 2A-2D, the optional Li Ion battery pack 30 is shown to include contact terminals 18a and 18b on the front of battery pack 10 which engage and electrically connect to terminals 17a and 17b. Likewise, battery pack 10 has on its rear side terminals 17a, 17b to connect to the next battery pack, if installed. The front side female contact terminals 18a and 18b connect to switching Vdc power supply or partnering Li Ion battery pack. Back side male contact terminals 17a and 17b connect to a partnering Li Ion battery pack.

In reference to the drawings and, in particular, FIGS. 3, 3A-3B, the switching Vdc power supply 10 allows for optional attachable, single Li Ion battery pack 30 to be connected and operational for standard standby capacity.

Figure 4A:
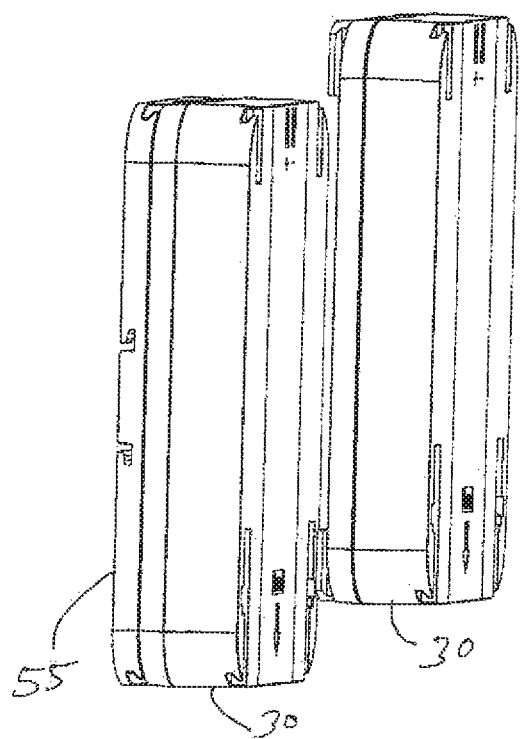
FIG. 4A is step 1 of an illustration for connecting switching multiple Li Ion battery packs.
Figure 4B:
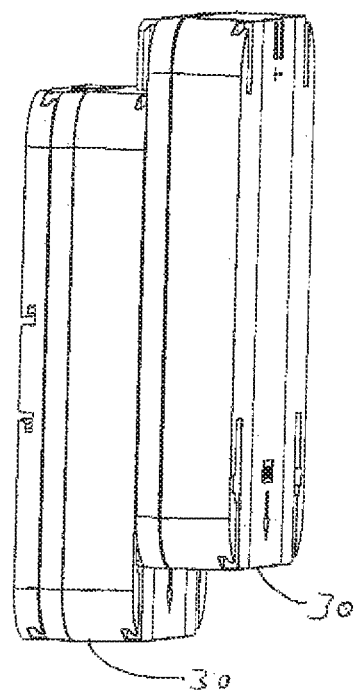
FIG. 4B is step 2 of an illustration for multiple Li Ion battery packs connected prior to connecting switching Vdc power supply.
Figure 4:
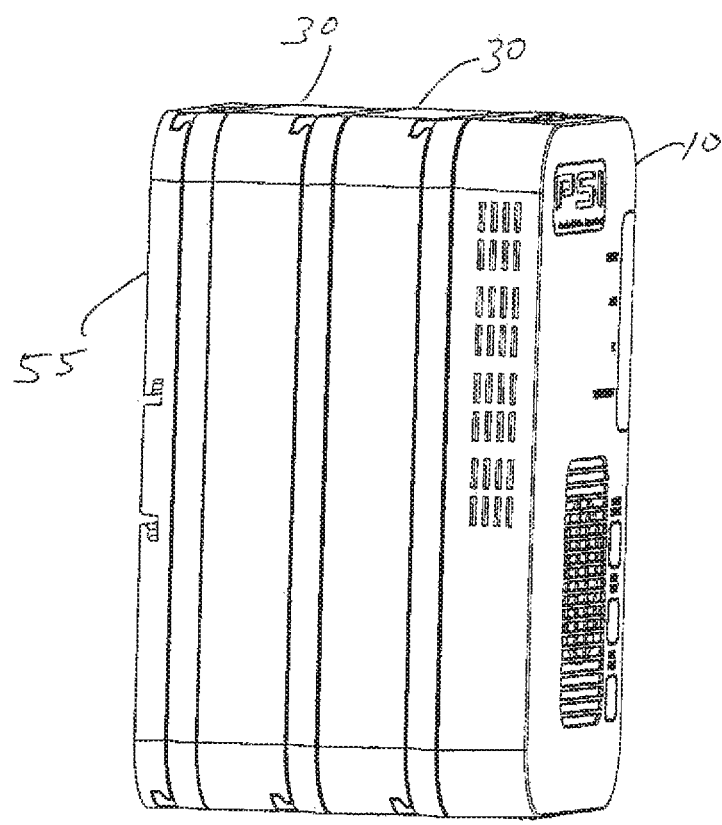
FIG. 4 is a side perspective view of a switching Vdc power supply with attached, multiple Li Ion battery packs (stacked battery packs), working together as an uninterruptable power supply.
Figure 5:
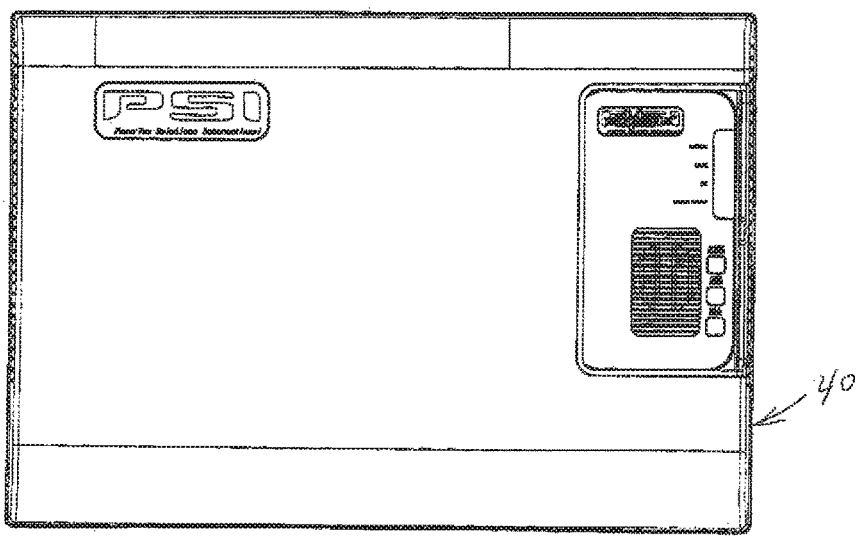
FIG. 5 is a front view of the universal enclosure with installed switching Vdc power supply.
Figure 5A:
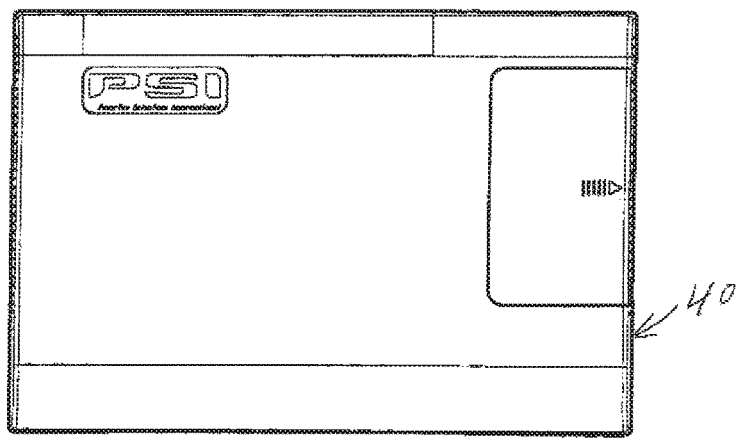
FIG. 5A is a front view of the universal enclosure with installed switching Vdc power supply.
Figure 5B:
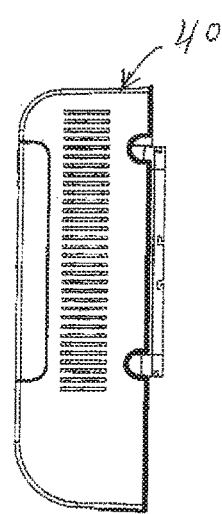
FIG. 5B is a side view of the universal enclosure with installed switching Vdc power supply.
Figure 5C:
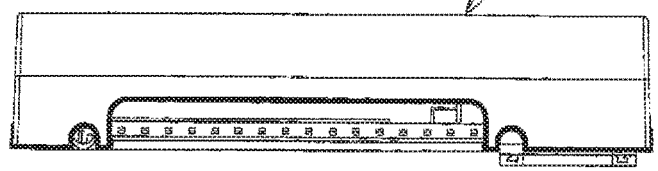
FIG. 5C is a bottom view of the universal enclosure with installed switching Vdc power supply.
Figure 5D:
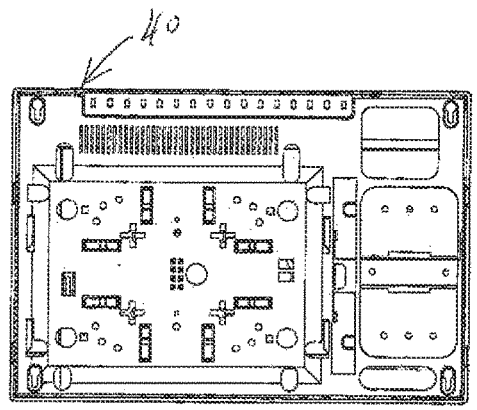
FIG. 5D is a back view of the universal enclosure with installed switching Vdc power supply.

In reference to the drawings and, in particular, FIGS. 4, 4A-4B, the switching Vdc power supply 10 allows for optional attachable, multiple Li Ion battery packs 30 to be connected and operational for increased standby battery capacity. The term "stacking" is used herein to indicate that multiple battery packs 30 are attached to the power supply 10.

As can be seen in the FIGS. 1A through 4B, battery packs 30 attached to power supply 10 and battery packs 30 attached to one another. As seen in FIG. 1D four connector feet 19a, 19b, 19c and 19d are located on the rear portion 20 of power supply 10 and on the rear portion 33 of battery pack 30. These feet 19a, 19b, 19c and 19d connect to grooves 31a, 31b, 31c and 31d located on the front portion 34 of battery pack 30. Feet 19a and 19b have a key 35a and 35b that fit and lock into notches 32a and 32b.

Power supply 10 has visual indicators with LED lights, for the battery LED 37 indicating service or replace battery or battery is not installed, mute LED 38 which indicates when flashing—audible alarm silence for 24 hours and when solid and audible alarm silence until manually enabled. LED DC 39 indicates a the power supply is working off standby power. System status LED 50 indicates the power supply is receiving AC power load to operate under normal conditions.

As seen in FIG. 3A a base protective plate 55 interfaces between the wall mount area and either a power supply 10 or a battery pack 30 mounting the system of either the power supply 10 for the combination of the power supply 10 with battery pack 30 to the wall.

In reference to the drawings and, in particular, FIGS. 5, 5A-5D, a universal enclosure 40 allows for an "All-In-One"

solution to house multiple variation and size CPE devices with switching Vdc power supply and optional Li Ion battery pack, as well as all input/output cabling to all active equipment. The universal enclosure can vary in size, however in a preferred embodiment it is approximately 24 inches wide 18 inches tall with a depth of 4 inches.

Figure 6:
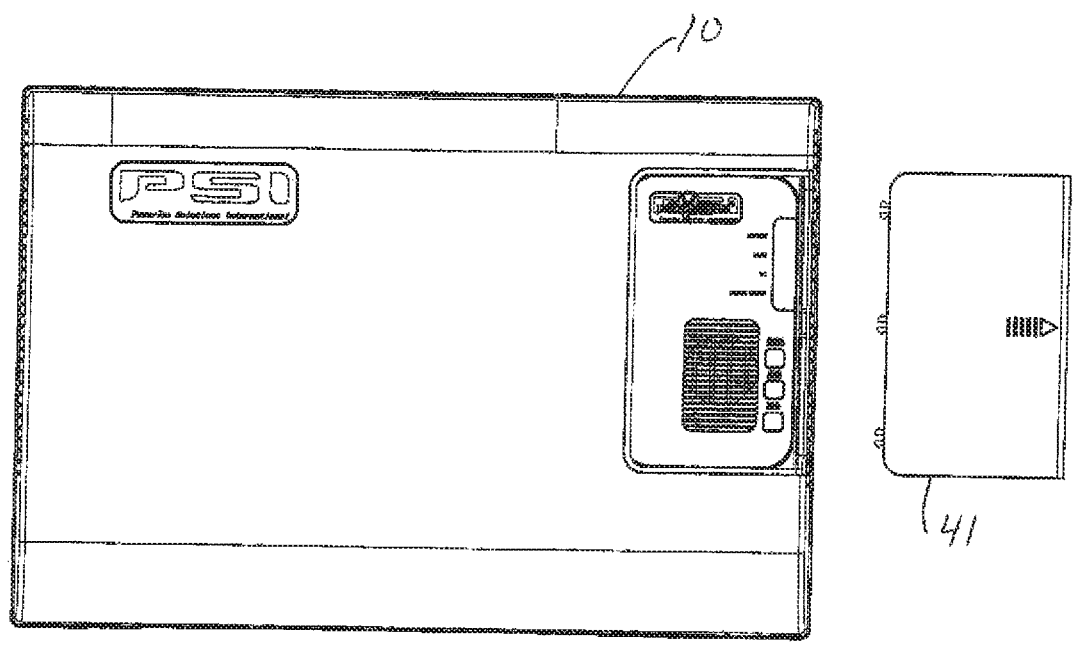
FIG. 6 is a front view of the universal enclosure with installed switching Vdc power supply illustrating the removable access window separated from the enclosure, with direction arrow to slide the removable access window back into the universal enclosure. When the removable access window is removed access is provided to operate control buttons on switching Vdc power supply.

In reference to the drawings and, in particular, FIG. 6, the universal enclosure 40 offers a removable access window 41 to allow the end user access to control buttons 11 on switching Vdc power supply 10.

Figure 7:
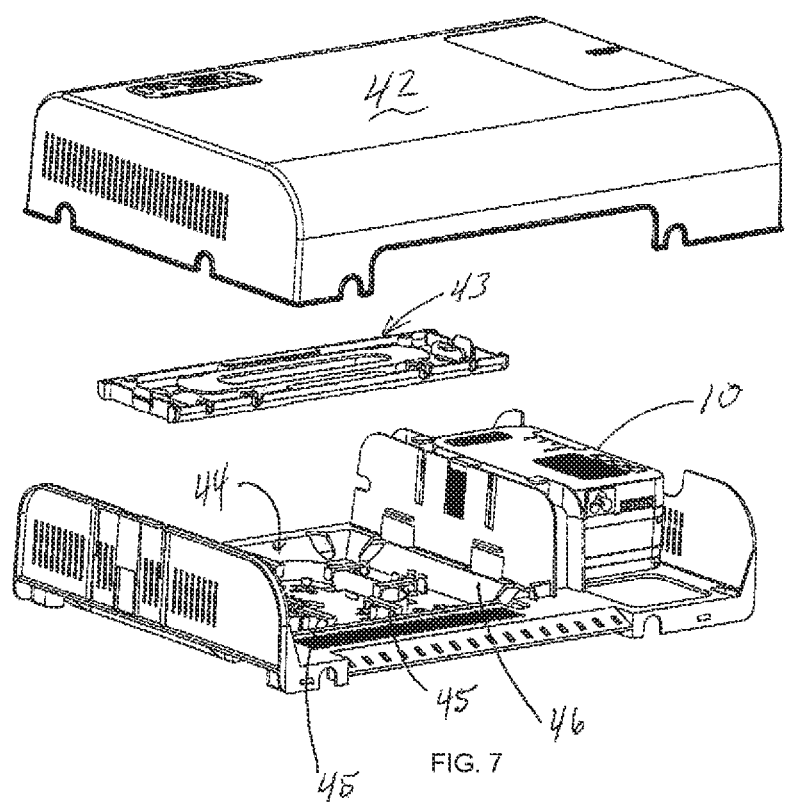
FIG. 7 is an exploded view of the universal enclosure (cover and internal structure) with installed switching Vdc power supply, the floating slack to a four fiber optic cable, illustrating the area for internal cable management and CPE device cavity.
Figure 8:
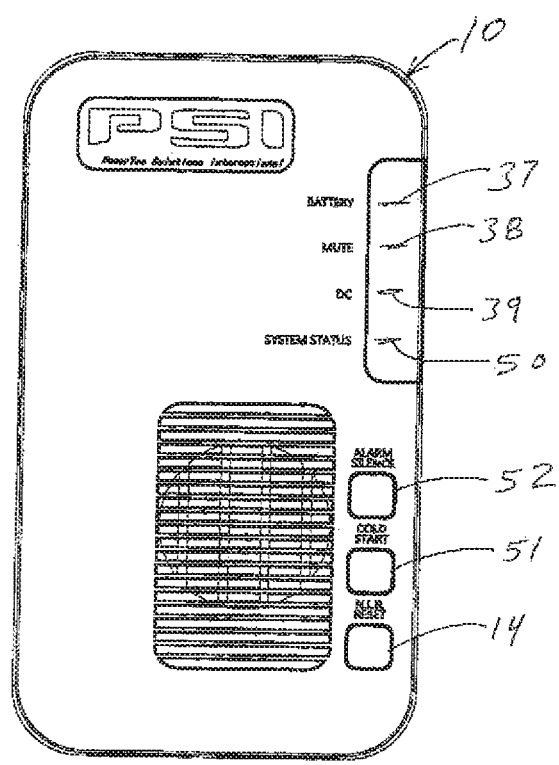
FIG. 8 is a front view of the switching Vdc power supply similar to FIG. 1A.

In reference to the drawings and, in particular, FIG. 7, the universal enclosure 40 offers a removable, protective cover 42 with internal CPE device "universal" cavity, Cable Management floating slack tray 43 and custom switching Vdc power supply recessed cavity area 44 with several wire supports 45 within said the cavity area 44. The cavity area 44 having has slanted walls 46 about the periphery of said the cavity area 44.

The present invention provides a "universal" enclosure to accept and securely house multiple variations of manufactured CPE devices of differing shapes and sizes with complimenting removable cover and access window.

The universal enclosure recited is designed with a movable fiber management tray to accommodate multiple CPE devices with variations in depth measurements.

The universal enclosure is designed with the combined solution to house the CPE device, fiber management and complimenting switching Vdc power supply and optional, attachable Li Ion battery pack(s).

The universal enclosure is designed with an "access window" allowing the end user the ability to access switching Vdc power supply "control buttons" without removing the universal enclosure cover.

The universal enclosure is custom designed to accommodate the world's smallest, scalable telecommunications switching Vdc power supply with attachable Li Ion battery pack(s) to offer an All-In-One enclosure to house CPE device and switching Vdc power supply with attachable battery pack comprised of Lithium Chemistry battery cells.

The switching Vdc power supply, is designed with network interface reset function, allowing push button disconnect/reconnect of Vdc output voltage to CPE device.

The switching Vdc power supply, is designed with "cold start" function, allowing push button reconnect of Vdc output voltage to the UPS and CPE device.

A modular switching Vdc power supply with removable, attachable lithium-based cell battery pack(s) is described. Wherein the switching Vdc power supply can operate as a standalone switching Vdc power supply under standard operation (Vac voltage is present) or operate from attached lithium based battery pack(s). When connected as a "system", the battery pack(s) and switching Vdc power supply are attached and functioning under normal conditions (Vac voltage is present), the lithium based battery pack(s) shall auto-initiate standby services when loss of Vac voltage is present. Also there shall be no interruption in Vdc output from the switching Vdc power supply when Vac voltage input is interrupted or disconnected.

The switching Vdc power supply will accept and operate with input Vac voltage of 100 Vac-240 Vac.

The switching Vdc power supply will accept and operate with multiple connected, stacked, lithium chemistry battery pack(s).

The battery pack will be designed within a housing and is comprised of at least one lithium-based rechargeable cell within said housing.

The switching Vdc power supply shall operate as a stand-alone power supply, without Li Ion battery pack, or with one or multiple Li Ion battery packs as a scalable, portable uninterruptable power supply.

The total discharging amount of each lithium-based cell in the battery pack typically can be from one (1) Ah to 5000 Ah, and charging voltage per one cell is 3.0 to 4.2 V. 2. A battery pack having the lithium-based cell is selected from the group consisting of $LiCoO_2$, $LiMn_2O_4$, $LiNiCoAlO_2$, $LiNiMnCoO_2$, and $Li_4Ti_5O_{12}$ cells.

A battery pack is described wherein the battery pack includes multiple lithium-based rechargeable cells in series and/or in parallel in the housing. A battery pack is provided, wherein the battery pack includes an even number of lithium-based rechargeable cells in the housing. A battery pack further includes a protection circuit board within the housing. A battery pack is provided wherein the protection circuit board is a cut-off board or a cell balancing circuit board. A battery pack is provided wherein the protection circuit board offers temperature monitoring and safety cut-off.

The "uninterruptable power supply" is portable for remote or local use as well as mobile, scalable standby Vdc power capabilities utilizing Lithium Cell Chemistries.

In summary, the present invention is a switchable direct current voltage power supply for powering a device having an uninterruptible power supply with additional standby power capacity having a switching power supply having a power input, the switching device having a power output for powering a device and having a first power pack attachable to the switching power supply for providing power to the device when the power input fails; and a second power pack attachable to the first power supply providing additional standby power capacity.

Additionally the switchable direct current voltage power supply has an attachable power pack that utilizes lithium chemistry.

We claim:

1. A switchable direct current voltage power supply for powering a device, having an uninterruptible power supply with additional standby power capacity comprising:

a switching power supply including an alternating current (AC) power input;

a first external battery pack including at least one battery;

said switching power supply including a direct current (DC) power output for powering said device and a set of battery pack connection terminals for providing an electrical connection between said switching power supply and said first external battery pack;

said first external battery pack removably stackable with said switching power supply to provide a DC output from said switching power supply to said at least one battery of said first external battery pack to charge said at least one battery and for providing power from said at least one battery to said switching power supply when said power input fails;

a second external battery pack including at least one battery, said second external battery pack removably stackable with said first external battery pack, to provide said DC output from said switching power supply to said at least one battery of said second external battery pack to charge said at least one battery and to provide additional power from said at least one battery to said switching power supply when said power input fails;

said first external battery pack including a set of power pack contact terminals for providing an electrical connection with said set of battery pack connection terminals of said switching power supply, said first external battery pack additionally including a set of battery pack connection terminals for providing an electrical connection with a set of power pack connection terminals of said second external power pack;

said switching power supply and each of said first external battery pack and second external battery pack including inter-connecting feet and grooves for releaseably attaching said first external battery pack to said switching power supply and said second external battery pack to said first external battery pack in a mating position to align and maintain a respective set of battery pack connection terminals in electrical contact with a respective set of power pack contact terminals to supply external battery power from one or more of said first external battery pack or said second external battery pack to said switching power supply when needed.

2. The switchable direct current voltage power supply as set forth in claim 1, wherein each said power pack is a lithium-based cell selected from the group consisting of LiCoO2, LiMn2O4, LiNiCoAlO2, LiNiMnCoO2, and Li4Ti5O12 cells.

3. A modular, stacking uninterruptible power backup system for powering a device, the system comprising:
a modular switching power supply having an alternating current (AC) power input, a DC power output for providing power to the device and a first connector of a first type on a first face of said modular switching power supply;
a first external battery pack including a second connector of a second type different from said first type on a first face of said first external battery pack, said second type of connector being configured to mate with, and electrically interconnect to, said first type of connector, said first external battery pack removably connected to said modular switching power supply to provide a DC output to charge at least one battery of said first external battery pack, and to provide power from said at least one battery to said modular switching power supply when said power input fails;
said first external battery pack including a third connector of said first type on a second face opposite said first face;
a second external battery pack removably attached to said first external battery pack, said second external battery pack including a fourth connector of said second type, said second external battery pack removably connected to said first external battery pack to receive said DC output produced by said switching power supply to charge said at least one battery of said second external battery pack, and to provide power from said at least one battery to said switching power supply when said power input fails; and
said switching power supply, said first external battery pack and said second external battery pack being removably connected in an aligned stack, with said first connector of said switching power supply detachably connected to said second connector of said first external battery pack, and said third connector of said first external battery pack detachably engaged with said fourth connector of said second external battery pack.

4. The system according to claim 3, wherein said first face of said switching power supply and said first face of said first external battery pack include inter-connecting feet and grooves to releaseably attach said first external battery pack to said switching power supply with said first connector mated with said second connector, and wherein said second face of said first external battery pack and said first face of said second external battery pack include inter-connecting feet and grooves to releaseably attach said second external battery pack to said first external battery pack with said third connector mated with said fourth connector.

5. A method for increasing the standby battery capacity of a modular, uninterruptible power backup system, the method comprising the steps of:
providing a modular switching power supply including an AC power input, a DC power output for providing a DC output to a device and a first electrical connector of a first type on a first face of the modular switching power supply, the first face including at least one mechanical connector;
providing a first external battery pack including a second electrical connector of a second type on a first face and a third electrical connector of the first type on a second face opposite the first face, the first face and second face each including at least one mechanical connector, the at least one mechanical connector on the first face of the first external battery pack configured to mate with the at least one mechanical connector on the first face of the switching power supply;
stacking the first external battery pack with the switching power supply by mating the at least one mechanical connector of the switching power supply with the at least one mechanical connector on the first face of the first external battery pack to removably attach the first external battery pack to the switching power supply in a stacked configuration with the first electrical connector mated with the second electrical connector;
providing a second external battery pack including at least a fourth electrical connector of the second type on a first face that includes at least one mechanical connector, with the at least one mechanical connector on the first face of the second external battery pack configured to mate with the at least one mechanical connector on the second face of the first external battery pack;
stacking the second external battery pack with the first external battery pack and switching power supply by mating the at least one mechanical connector on the first face of the second external battery pack with the at least one mechanical connector on the second face of the first external battery pack to removably attach the second external battery pack to the first external battery pack in a stacked configuration with the third electrical connector mated to the fourth electrical connector; and
applying an AC power input to the modular switching power supply to produce a DC power output, the DC power output being provided to the device and to at least one battery of the first external battery pack and at least another battery of the second external battery pack for charging, via the interconnection of the first and second electrical connectors and the third and fourth electrical connectors, and to provide power from the at least one battery and the at least another battery to the modular switching power supply when the power input fails.

6. The method of claim 5, wherein the second external battery pack has a second side, opposite said first side, said second side including a fifth electrical connector of the first type and at least one mechanical connector, said method further comprising the steps of:
providing a third external battery pack including at least a sixth electrical connector of the second type on a first face that includes at least one mechanical connector configured to mate with the at least one mechanical connector on the second face of the second external battery pack;

stacking the third external battery pack with the second external battery pack, first external battery pack and switching power supply by mating the at least one mechanical connector on the first face of the third external battery pack with the at least one mechanical connector on the second face of the second external battery pack to removably attach the third external battery pack to the second external battery pack in a stacked configuration with the fifth electrical connector mated to the sixth electrical connector to further increase the standby battery capacity of the modular, uninterruptible power backup system.

7. The method of claim 6, wherein each at least one mechanical connector is selected to be at least one of a foot or an interlocking groove configured to removeably engage a foot.

* * * * *

(12) POST-GRANT REVIEW CERTIFICATE (223rd)

United States Patent
Battat et al.

(10) Number: US 10,637,264 J1
(45) Certificate Issued: Feb. 18, 2022

(54) PORTABLE SWITCHING POWER SUPPLY WITH ATTACHABLE BATTERY PACK AND ENCLOSURE

(71) Applicants: Stanley Battat; Drew M. Hardin

(72) Inventors: Stanley Battat; Drew M. Hardin

(73) Assignee: POWERTEC SOLUTIONS INTERNATIONAL LLC

Trial Number:

PGR2021-00043 filed Jan. 28, 2021

Post-Grant Review Certificate for:

Patent No.: 10,637,264
Issued: Apr. 28, 2020
Appl. No.: 14/864,149
Filed: Sep. 24, 2015

The results of PGR2021-00043 are reflected in this post-grant review certificate under 35 U.S.C. 328(b).

POST-GRANT REVIEW CERTIFICATE
U.S. Patent 10,637,264 J1
Trial No. PGR2021-00043
Certificate Issued Feb. 18, 2022

AS A RESULT OF THE POST-GRANT REVIEW PROCEEDING, IT HAS BEEN DETERMINED THAT:

Claims 1-7 are cancelled.

\* \* \* \* \*